(12) United States Patent
Matsuda et al.

(10) Patent No.: US 7,451,269 B2
(45) Date of Patent: Nov. 11, 2008

(54) ORDERING REAL-TIME ACCESSES TO A STORAGE MEDIUM

(75) Inventors: Hakuro Matsuda, Redmond, WA (US); John M. Harding, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/166,337

(22) Filed: Jun. 24, 2005

(65) Prior Publication Data

US 2006/0294329 A1 Dec. 28, 2006

(51) Int. Cl.
G06F 12/00 (2006.01)
(52) U.S. Cl. .................... 711/111; 369/53.34
(58) Field of Classification Search ............ 711/111; 369/53.34
See application file for complete search history.

(56) References Cited

U.S. PATENT DOCUMENTS

| | | | | |
|---|---|---|---|---|
| 5,463,758 | A * | 10/1995 | Ottesen | 711/114 |
| 5,940,855 | A * | 8/1999 | Kayes et al. | 711/118 |
| 6,272,598 | B1 * | 8/2001 | Arlitt et al. | 711/133 |
| 6,487,633 | B1 * | 11/2002 | Horst et al. | 711/112 |
| 7,366,833 | B2 * | 4/2008 | Chanda et al. | 711/112 |
| 7,383,400 | B2 * | 6/2008 | Eng et al. | 711/154 |
| 2004/0064640 | A1 * | 4/2004 | Dandrea et al. | 711/114 |
| 2005/0149667 | A1 * | 7/2005 | Nakayama et al. | 711/114 |

OTHER PUBLICATIONS

U.S. Appl. No. 11/142,905, filed Jun. 1, 2005 Matsuda et al.
"Tell Me About Middleware, Episode 2 What is Multi-Stream?," CRI Middleware, Copyright 2002, last accessed May 23, 2005 (5 pages) http://www.cri-mw.co.jp/comic/naze2e/page1_e.htm.
CRI Middleware Products, CRI ADX Multi Stream Sound System, last accessed May 23, 2005 (3 pages) http://www.cri-mw.co.jp/products/product_adx_e.htm.

* cited by examiner

*Primary Examiner*—Kevin L Ellis
*Assistant Examiner*—Jared I Rutz
(74) *Attorney, Agent, or Firm*—Perkins Coie LLP

(57) ABSTRACT

A method and system for servicing read requests directed to a storage medium by reordering the read requests when advantageous to do so and when the read requests can be serviced in a time-sensitive manner is provided. A reorder system determines whether it would be advantageous to reorder an identified read request that is currently scheduled to be serviced before another read request and whether there is enough time to service the other read request before servicing the identified read request. If there is enough time and it would be advantageous, the reorder system reorders the read requests so that the other read request is serviced before the identified read request.

20 Claims, 15 Drawing Sheets

ORDERING REAL-TIME ACCESSES TO A STORAGE MEDIUM

BACKGROUND

Storage media, such as DVDs and CD-ROMs, are used to store vast amounts of information that need to be accessed in real time by various applications such as computer game applications. A storage medium may contain data of various media types such as audio, video, text, and so on. The data of the various media types often need to be streamed to an application in real time so that the application can render the media in a time-sensitive manner (e.g., real time). For example, a video game may need to render the images of a scene at the same time as the sounds of the scene are rendered. To read the data, an application executing on a computing device may interface with a storage medium driver that in turn interfaces with a storage medium reading device (e.g., a DVD reader) to read the data of the storage medium. The application requests the storage medium driver to read data from a certain unit of data (e.g., file or sector) of the storage medium currently being accessed by (e.g., inserted into) the storage medium reading device. The storage medium driver directs the storage medium reading device to retrieve the data from the storage medium. After a successful read, the storage medium driver provides the read data to the application.

The time to read data from certain types of storage media varies based on the location of the data on the storage medium, current radial location of the read head, and current rotational location of the data position relative to the read head. For example, a CD-ROM may be read by a reading device that has a read head that moves radially from the outer edge of the CD-ROM to the inner edge of the CD-ROM as the CD-ROM rotates. If the current radial location of the read head is at an outer edge and the location of the data to be read is that an inner edge, then the reading device moves the read head radially to the location of the data and waits for the CD-ROM to rotate until the location of data is under the read head. The process of moving the read head radially and waiting for the rotation of the CD-ROM is referred to as seeking and the time it takes to seek is referred to as "seek time." The seek time varies based on both the radial and rotational distance from the current location of the read head to the location of the data. Once the read head is both radially and rotationally at the location of the data, the reading device can start reading the data. The time it takes to read the data is referred to as "read time." Thus, the total "access time" is the sum of the seek time and read time.

The time it takes to read data can also vary primarily due to damage to the storage medium. It can be difficult for a storage medium reading device to read the data from a storage medium that is damaged, which can often occur as a result of user handling. Although removable storage media allow flexibility to access different storage media and to move the storage media from one reading device to another, the handling of storage media by a person often results in damage, such as scratches, dirt, and so on, to storage media. To help minimize the adverse effects of damage to storage media, developers use various techniques to help ensure that data can be read from a storage medium even though it is damaged in some way. For example, a storage medium driver may initially attempt to read a unit of a storage medium at a high speed. If the initial attempt to access a file fails, the storage medium driver may retry the attempt a few more times. If those attempts fail, the storage medium driver may attempt to read the unit at a lower speed, which may result in a successful read of the unit. As another example of an attempt to minimize adverse effects of damage, the provider of a storage medium may store important files redundantly on the storage medium. For example, when the storage medium is a DVD, the provider may store an important unit on an outer track of the DVD and a copy of that important unit on an inner track of the DVD. In this way, if one of the copies of the unit is damaged, the storage medium driver can attempt to read the unit from the other copy.

Although techniques have been in use that reorder read requests to access a storage medium, those techniques have typically not considered the time-sensitive nature of the access. For example, some techniques have simply ordered the read requests to minimize overall access time without regard to when the accessed data is actually needed by the accessing application. In addition, these techniques do not factor in the variable read time that results from damage to a storage medium.

SUMMARY

A method and system for servicing read requests directed to a storage medium by reordering the read requests when advantageous to do so and when the read requests can be serviced in a time-sensitive manner is provided. A reading device used to read the storage medium may have a characteristic that would make it advantageous to reorder read requests (e.g., the reordering would result in less total service time). A reorder system determines whether it would be advantageous to reorder an identified read request that is currently scheduled to be serviced before another read request and whether there is enough time to service the other read request before servicing the identified read request. There is enough time when the data of the identified read request can still be read before it is needed by an accessing program. If there is enough time and it would be advantageous, the reorder system reorders the read requests so that the other read request is serviced before the identified read request. In this way, the reorder system reorders read requests when advantageous to do so and the timing requirement of accessing programs can be satisfied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
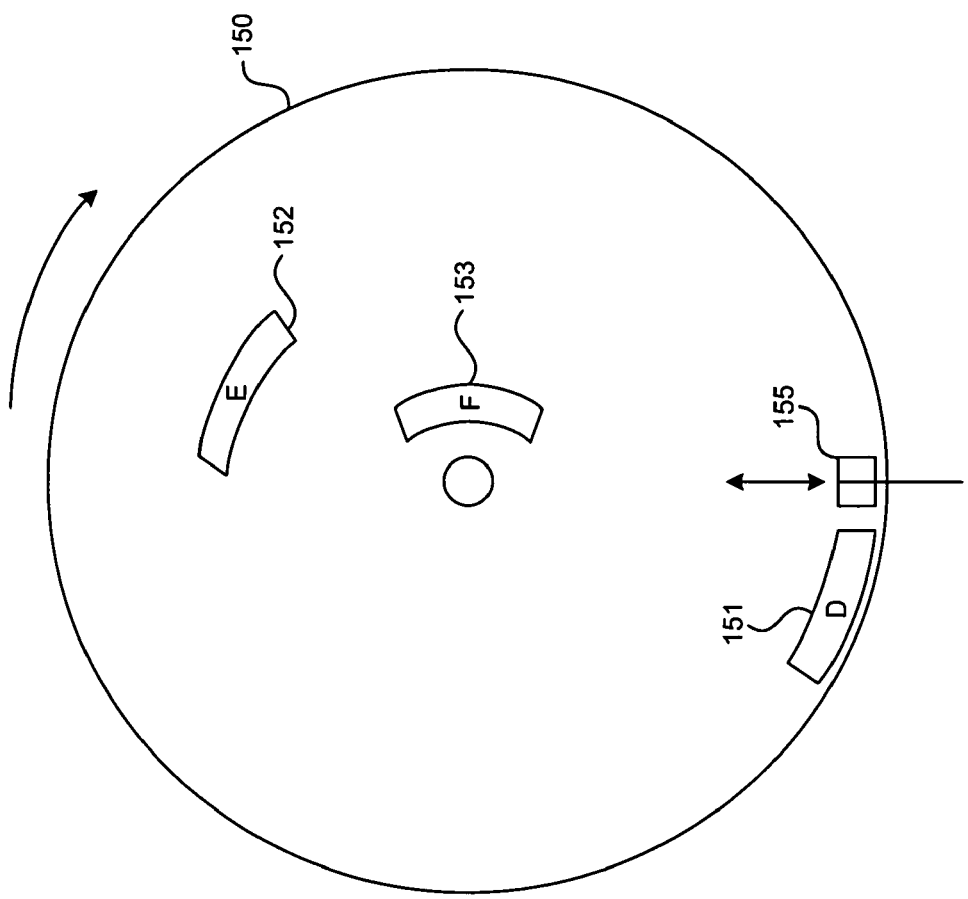
FIG. 1A is a diagram that illustrates radial and rotational access of a data on a typical DVD storage medium.

A method and system for servicing read requests in a time-sensitive manner by reordering the read requests is provided. In one embodiment, the reorder system identifies a next read request that is to be serviced. For example, the applications executing on a computer system may submit their read requests to an operating system. The operating system may add the read requests to a read queue. The reorder system, which may be part of the operating system, accesses the read queue to identify the next read request from the read queue. After the next read request is identified, the reorder system determines whether there is enough time to service another read request before servicing the identified read request and whether the reordering would be advantageous. For example, if the read head is currently located at an outer edge of the storage medium and the location of the data to be read is at an inner edge, then the reading device driver may have enough time to service a read request that specifies data at an intermediate location in between the inner and outer edges. If the data of the identified read request is needed in 1.5 seconds (i.e., "needed time") and the access time from the intermediate location of the read head would be 0.6 seconds, then the reorder system will have enough time to read the data at the intermediate location if its access time will be less than 0.9 seconds. The reordering could be advantageous for several reasons. For example, the reordering could be advantageous if the needed time associated with the other read request could not be satisfied if the identified read request is serviced first. As another example, the reordering may be advantageous if the total time needed to service both the identified read request and the other read request is reduced by the reordering. When the reordering is advantageous and the needed time of the identified read request can be satisfied, the reorder system reorders the read requests so that the data at the intermediate location is read before the data at the location of the identified read request. The needed time may be specified by the requesting application, may be a system default time, may be calculated by the system based on various attributes (e.g., priority) of the read request, and so on. In this way, the reorder system factors in the needed time associated with data when reordering read requests.

In one embodiment, the reorder system is integrated with an access system and factors in read statistics of previous reads of the storage medium gathered by the access system when determining whether there is enough time to service a read request before the identified read request is serviced. The access system tracks read statistics generated from previous attempts to read data of the storage medium, which may be stored on a per-unit (e.g., per-file or per-sector) basis. For example, when the access system reads data from the storage medium, the access system may record the speed at which the read was successful and the number of attempts needed for the successful read at that speed. When the access system receives a request to read data of the storage device, the access system may generate a read plan for the read based on analysis of the read statistics. A read plan may specify the initial speed of the attempt to read the data. For example, the read statistics may indicate that a unit was successfully read at a medium speed, but only after several unsuccessful attempts at that medium speed. In such a case, the read plan may indicate that the initial read speed should be slow in hopes that in the unit can be read after the first attempt, rather than making several attempts at a higher read speed. Alternatively, the read plan may indicate to make one attempt at reading the unit at a medium read speed and if unsuccessful, then start attempting to read the unit at a low read speed. The reorder system may use the read plan to estimate the read times to service the identified read request and a read request that may be serviced first.

In one embodiment, the access system may cache data read from a storage medium giving caching priority to important data that is difficult to read. If the access system has difficulty reading a unit of data, then it may be likely that the access system would have difficulty rereading that unit of data at a later time. In such a case, the access system may cache that unit of data so that it need not be reread from the storage medium. Since the size of a cache is typically relatively small compared to the size of the storage medium, only a small portion of the data of the storage media can be cached. As a result, the access system may cache units of data giving preference to units with a low readability score. A readability score attempts to estimate the ease at which a unit of data can be read based on the read statistics. For example, a readability score of 1.0 may indicate that the next read of the unit of data will likely be successful on the first attempt at a high speed, whereas a readability score of 0.2 may indicate that the next read will likely be successful on the third attempt at a low speed. When the cache is full, the access system may use a cache replacement policy that replaces the unit with the highest readability score with a newly read unit with a lower readability score. For example, if the cache contains five units with readability scores of 0.8, 0.8, 0.5, 0.2, and 0.1 and a new unit is read from the storage medium with a readability score of 0.4, then the replacement policy indicates to replace one of the units of data with a readability score of 0.8. After the replacement, the cache will contain five units with readability scores of 0.8, 0.5, 0.4, 0.2, and 0.1. The readability score may also factor in the importance of the information stored in the unit of data. For example, a unit of data that contains a background scene of a video game may be relatively unimportant compared to a unit of data that contains the image of the main character of the video game. In this way, the access system can cache important information that may be difficult to reread from the storage medium.

In one embodiment, the access system may not have previously read a unit of data of the storage medium and therefore may not have read statistics for that unit of data. (The access system may discard read statistics when a storage medium is removed from the storage medium reading device because a user may have removed the storage medium to repair the damage (e.g., clean the storage medium).) In such a case, the access system may generate a readability score for a unit based on read statistics for units stored nearby on the storage medium. If nearby units are damaged in some way, the likelihood of the unit being also damaged is high. For example, if the nearby units have a very low readability score, then the access system may develop a read plan that sets the initial read speed to low in hopes that the unit can be read on the first attempt. More generally, even if the access system has read statistics for a unit, it may calculate a readability score that factors in the readability of nearby units. For example, when a unit currently has a readability score of 1.0, but nearby units have a readability score of 0.1, the access system may develop a read plan assuming that the readability score of 1.0 may not be an accurate representation of the readability of that unit.

FIG. 1A is a diagram that illustrates radial and rotational access of a data on a typical DVD storage medium. The DVD 150 includes file D 151, file E 152, and file F 153. The read head 155 of the reading device moves radially between the outer and inner edges of the DVD. The reading device rotates the DVD in this example in a clockwise direction. In this example, the reading device has just completed reading file D. If file F is the next file in the read queue, the reorder system determines whether there is enough time to read file E before reading file F. To make this determination, the reorder system factors in the seek time and read time for file E from the current location of the read head and the seek time and read time for file F after reading file E. The reorder system may estimate the read time based on the read statistics of the access system.

Figure 1B:
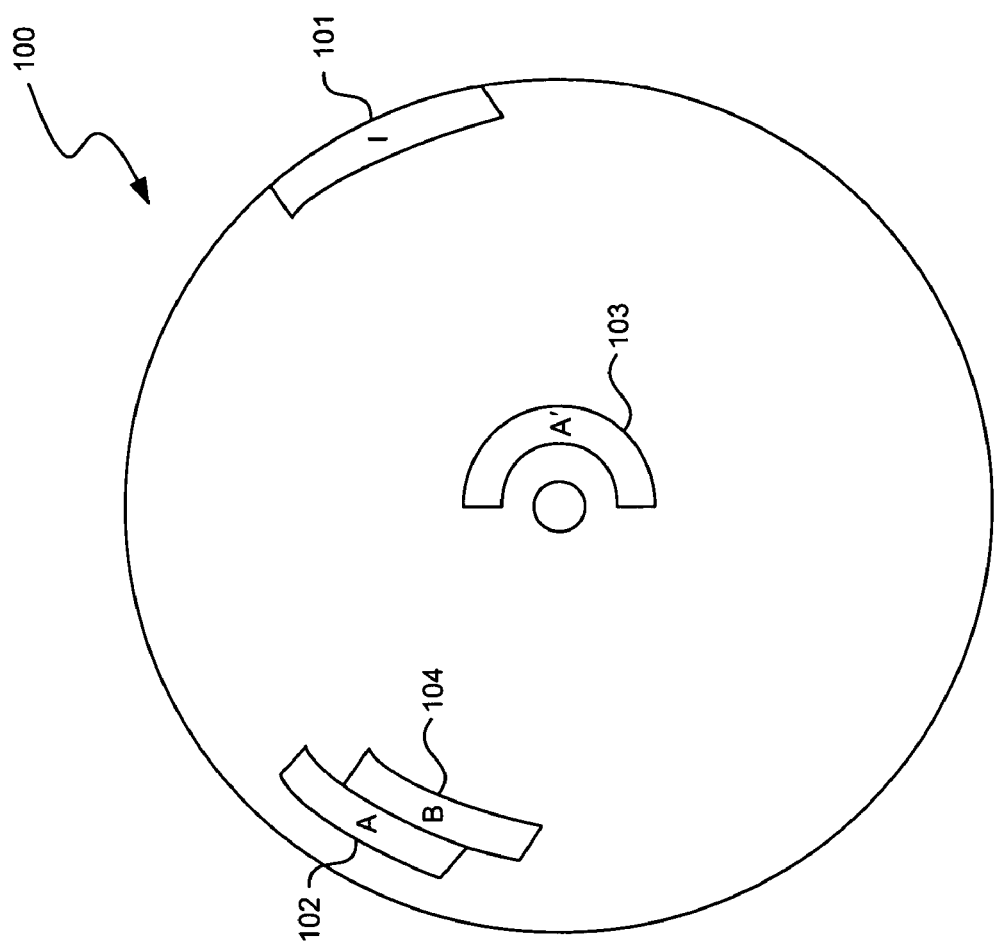
FIG. 1B is a diagram that illustrates the layout of a typical DVD storage medium accessed by the access system.

FIG. 1B is a diagram that illustrates the layout of a typical DVD storage medium accessed by the access system. The DVD 100 includes a file index 101 that contains a mapping of the names of the files that are stored on the DVD to their locations. The index may identify the start sector of each file along with the number of sectors in the file. The DVD includes file A 102, file A' 103, and file B 104. File A and file A' are redundant copies of the same file. If one copy of the file is damaged, then the other copy may be accessible. File B is stored near file A. If read statistics are not available for file A, the access system may use read statistics associated with file B to develop a read plan for file A. If file B has a high readability score, then file A would likely have a high readability score. Similarly, if file B has a low readability score, then file A would also likely have a low readability score.

Figure 2A:
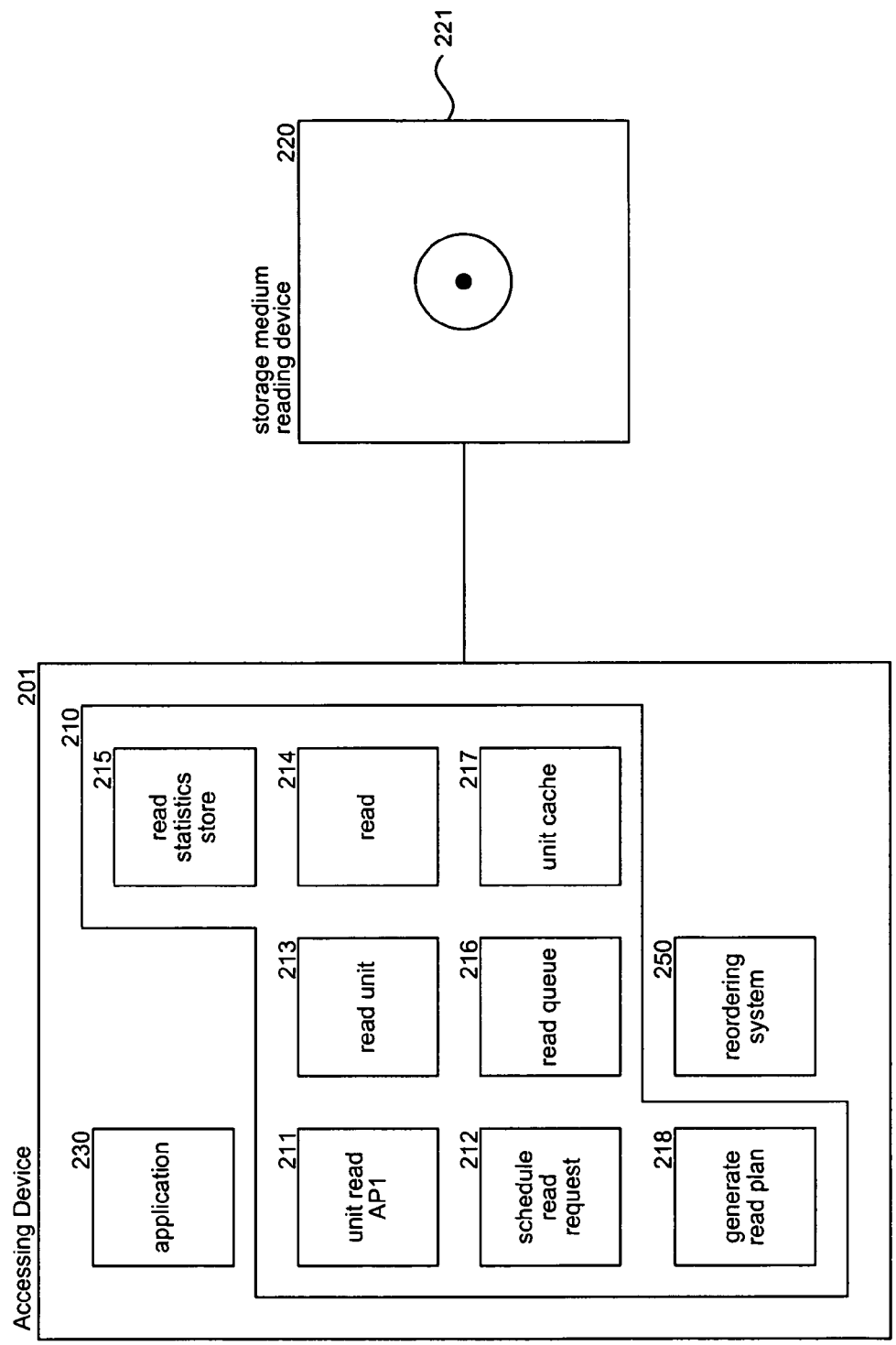
FIG. 2A is a block diagram that illustrates components of the access system integrated with the reorder system in one embodiment.

FIG. 2A is a block diagram that illustrates components of the access system integrated with the reorder system in one embodiment. Accessing device 201 includes an access system 210, an application 230 (e.g., a video game), and a reorder system 250. The accessing device is connected to a storage medium reading device 220, which is currently accessing storage medium 221. The access system includes a unit read API 211, a schedule read request component 212, a read unit component 213, a read component 214, and a generate read plan component 218. The application invokes the unit read API to submit read requests. The unit read API invokes the schedule read request component to schedule read requests. The schedule read request component places read requests in a read queue 216. The schedule read request component may invoke the generate read plan component to generate the read plan for accessing the unit. The read queue may be sorted based on various attributes of the read request such as submitted time, needed time, and so on. The read unit component identifies read requests from the read queue and invokes the read component to control the reading of the unit from the storage medium. The read unit component stores read statistics from a read statistics store 215 and caches units in a unit cache 217. The schedule read request component develops a read plan based on the readability scores of the units as derived from the read statistics store. The access system invokes an embodiment of the reorder system to determine whether another read request should be serviced before the identified read request. In this embodiment of the reorder system, it is invoked passing an indication of the identified read request and returns an indication as to whether another read request should be serviced first. The reorder system may be invoked by the read unit component just before it directs the reading device to read the unit, or it may be invoked by the schedule read request component just before it adds a read request to the read queue.

Figure 2B:
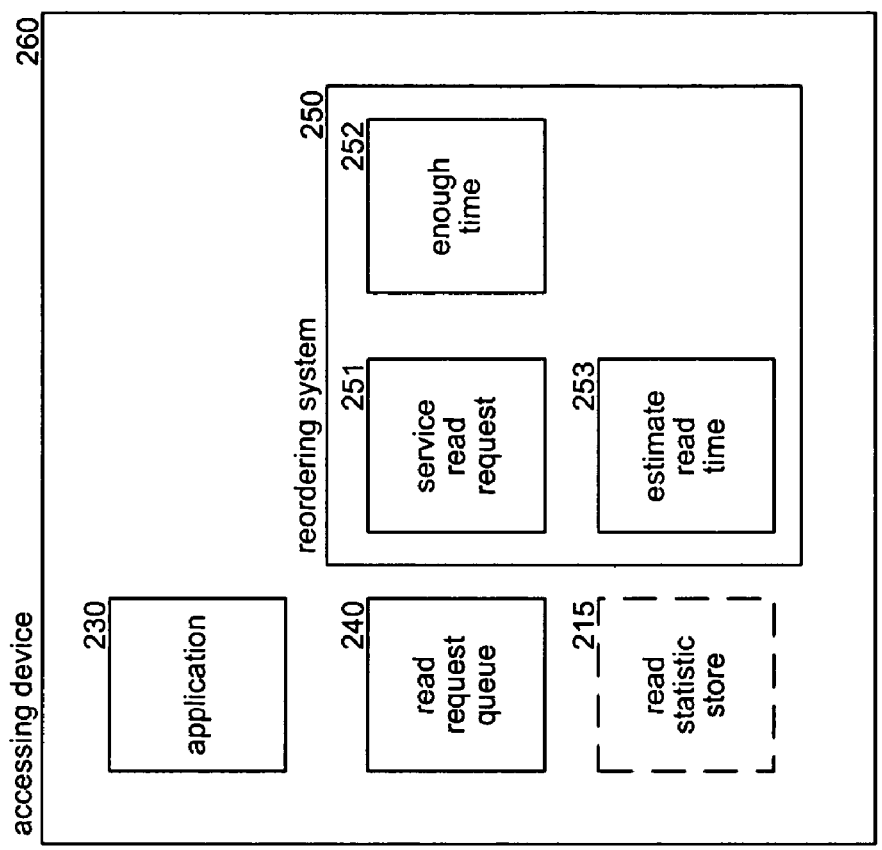
FIG. 2B is a block diagram that illustrates components of the reorder system in one embodiment.

FIG. 2B is a block diagram that illustrates components of the reorder system in one embodiment. In this embodiment, the reorder system 250 is not simply invoked by the access system but functions more as a replacement to the access system. The accessing device 260 may include an application 230, a read queue 240, the reorder system 250, and an optional read statistics store 215. As the application submits a read request to the operating system, the operating system stores the read requests in the read queue. The reorder system includes a service read request component 251, an enough time component 252, and an estimate read time component 253. The service read request component identifies the read request at the top of the read queue and determines whether there is enough time to service another read request before servicing the identified read request. The service read request component invokes the enough time component to determine whether there is enough time to service another read request. The enough time component invokes the estimate read time component to estimate the read time for a read request. The estimate read time component may factor into its estimate of the read time the read statistics of the read statistics store.

The computing device on which the reorder system is implemented may include a central processing unit, memory, input devices (e.g., keyboard and pointing devices), output devices (e.g., display devices), and storage devices (e.g., disk drives). The memory and storage devices are computer-readable media that may contain instructions that implement the reorder system. In addition, the data structures and message structures may be stored or transmitted via a data transmission medium, such as a signal on a communications link.

Embodiments of the reorder system may be implemented in various operating environments that include video game consoles, personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. A storage medium may be any medium whose read performance can degrade over time or whose read performance may vary based on unit location.

The reorder system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The component may also be implemented in any combination of hardware and software.

Figure 10:
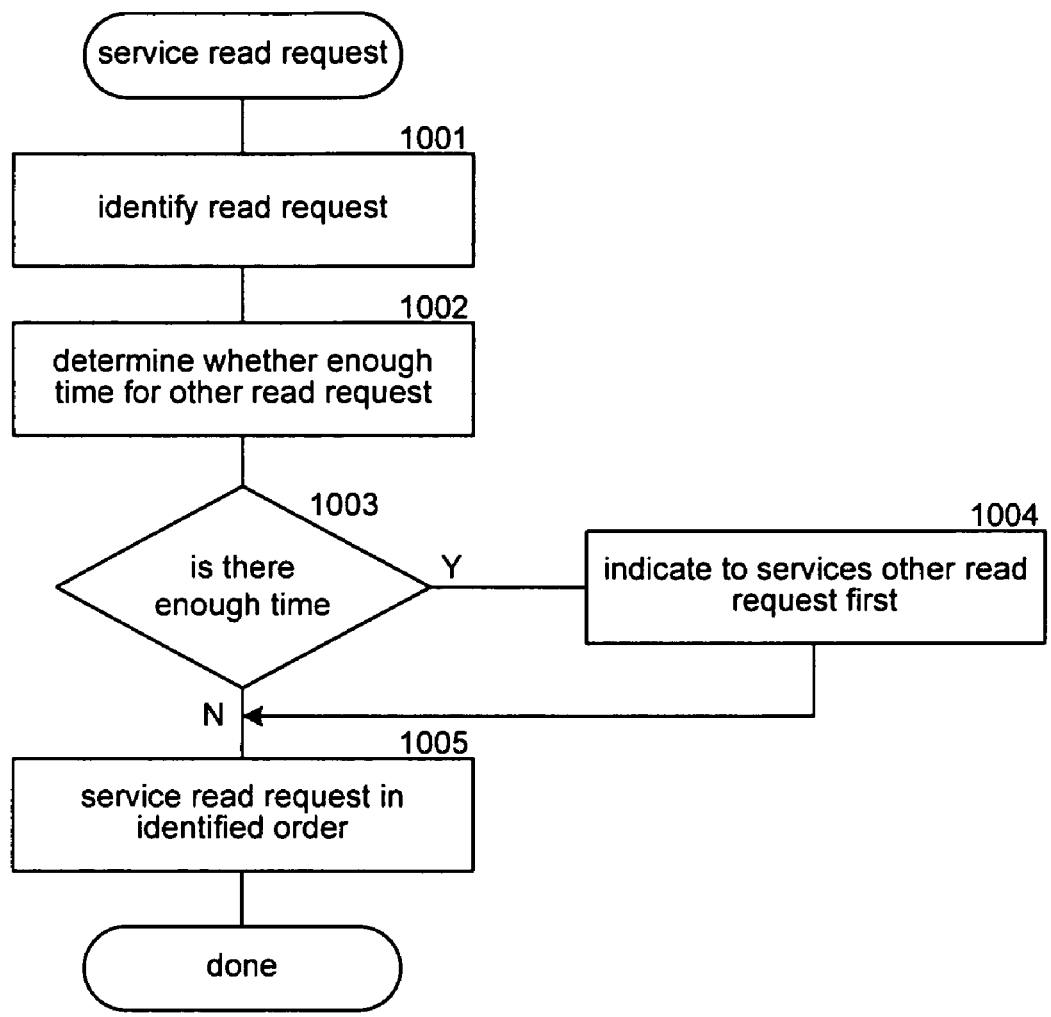
FIG. 10 is a flow diagram that illustrates high-level processing of the service read request component of the reorder system in one embodiment.

FIGS. 10-13 are flow diagrams that illustrate the processing of the reorder system in the embodiment illustrated by FIG. 2B. FIG. 10 is a flow diagram that illustrates high-level processing of the service read request component of the reorder system in one embodiment. The component identifies a read request to be serviced, determines whether there is enough time to service another read request, and if so, services that other read request before servicing the identified read request. In block 1001, the component identifies a read request to be serviced. The read request may be the top read request in the read queue. In block 1002, the component determines whether there is enough time for another read request to be serviced before servicing the identified read request. In decision block 1003, if there is enough time to service another read request, then the component continues at block 1004, else the component continues at block 1005. In block 1004, the component indicates to service the other read request before servicing the identified read request and continues in block 1005. In block 1005, the component services the identified read request and the other read request in the indicated order and then completes. In one embodiment, the reorder system may reorder the read requests as they are added to the read queue. In such embodiment, the reorder system may analyze the read requests of the read queue and determine where in the read queue to add the new read request. For example, if the read queue currently contains a read request for a unit at an outer edge followed by a read request for a unit at an inner edge, then the reorder system may place a new read request for a unit that is in between the inner and outer edges after the read request for the outer edge and before the read request for the inner edge, assuming that there is enough time to service the new read request before servicing the read request for the inner edge. In this way, the read unit component that is responsible for controlling the reading device can service the read requests in the order indicated by the already reordered read queue.

Figure 11:
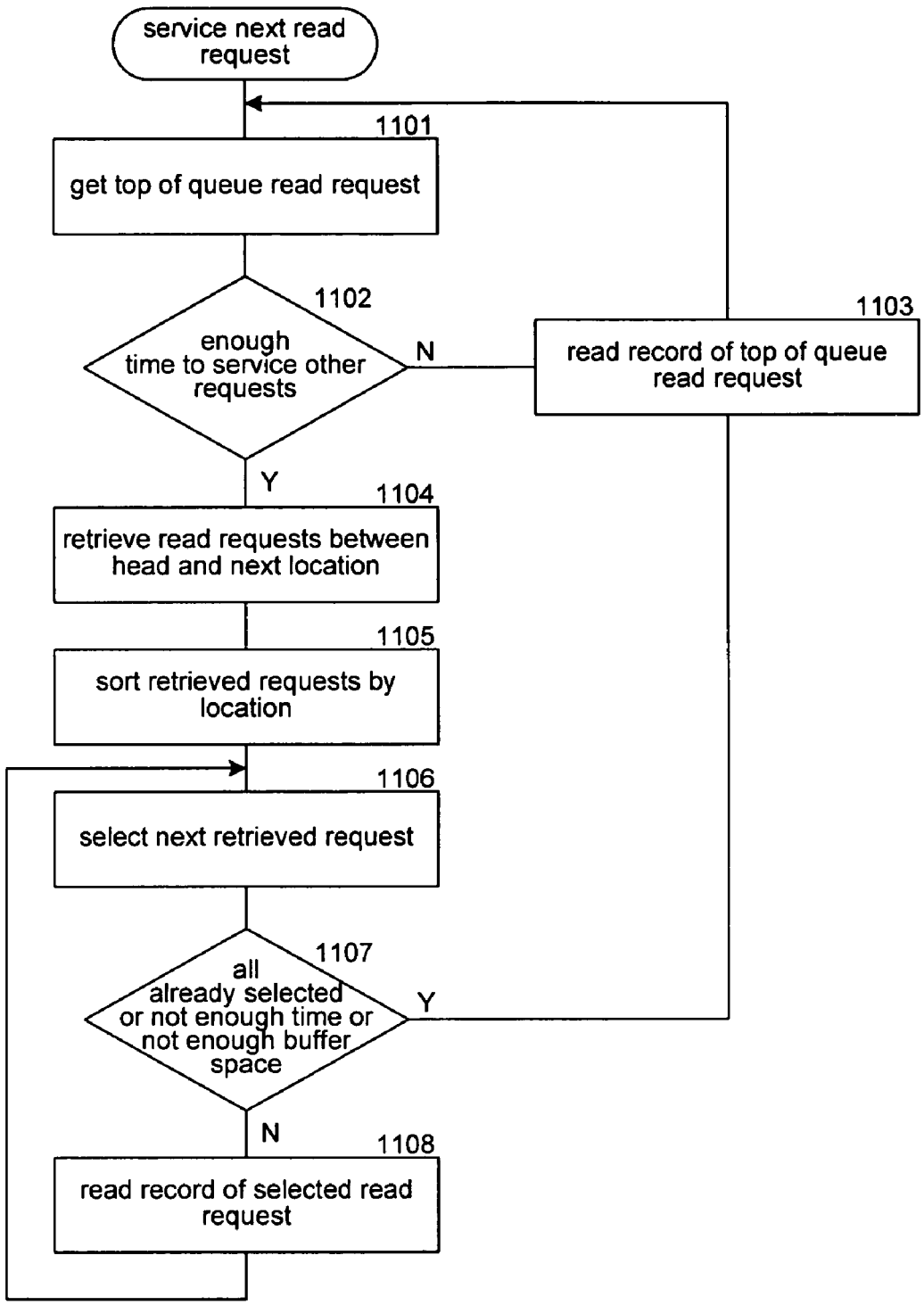
FIG. 11 is a flow diagram that illustrates low-level processing of the service read request component of the reorder system in one embodiment.

FIG. 11 is a flow diagram that illustrates low-level processing of the service read request component of the reorder system in one embodiment. The component identifies a read request to be serviced, determines whether there is enough time to service another read request, and if so, services that other read request before servicing the identified read request. The component loops servicing read requests of the read queue and reordering the read requests as appropriate while attempting to ensure that the timing needs of the requesting applications are satisfied. In block 1101, the component gets the read request from the top of the read queue. In decision block 1102, if there is enough time to service another read request before servicing the read request from the top of the read queue, then the component continues at block 1104, else the component continues at block 1103. In block 1103, the component reads the unit identified by the read request at the top of the read queue, removes the read request from the read queue, and then loops to block 1101 to get the read request currently at the top of the read queue. In block 1104, the component retrieves read requests from the read queue that specify units that are located in between the current position of the read head and the location of the unit specified by the read request at the top of the read queue. In block 1105, the component sorts the retrieved read requests by location. In blocks 1106-1108, the component loops selecting the retrieved read requests in sorted order and determining whether there is enough time to service the selected read request before servicing the read request at the top of the read queue. In block 1106, the component selects the next retrieved read request in sorted order. In decision block 1107, if all the retrieved read requests have already been selected, if there is not enough time to service the selected read request, or if there is not enough buffer space to service the selected read request, then the component continues at block 1103 to service the read request at the top of the read queue, else the component continues at block 1108. In block 1108, the component reads the unit of the selected read request, removes the selected read request from the read queue, and then loops to block 1106 to select the next retrieved read request.

Figure 12:
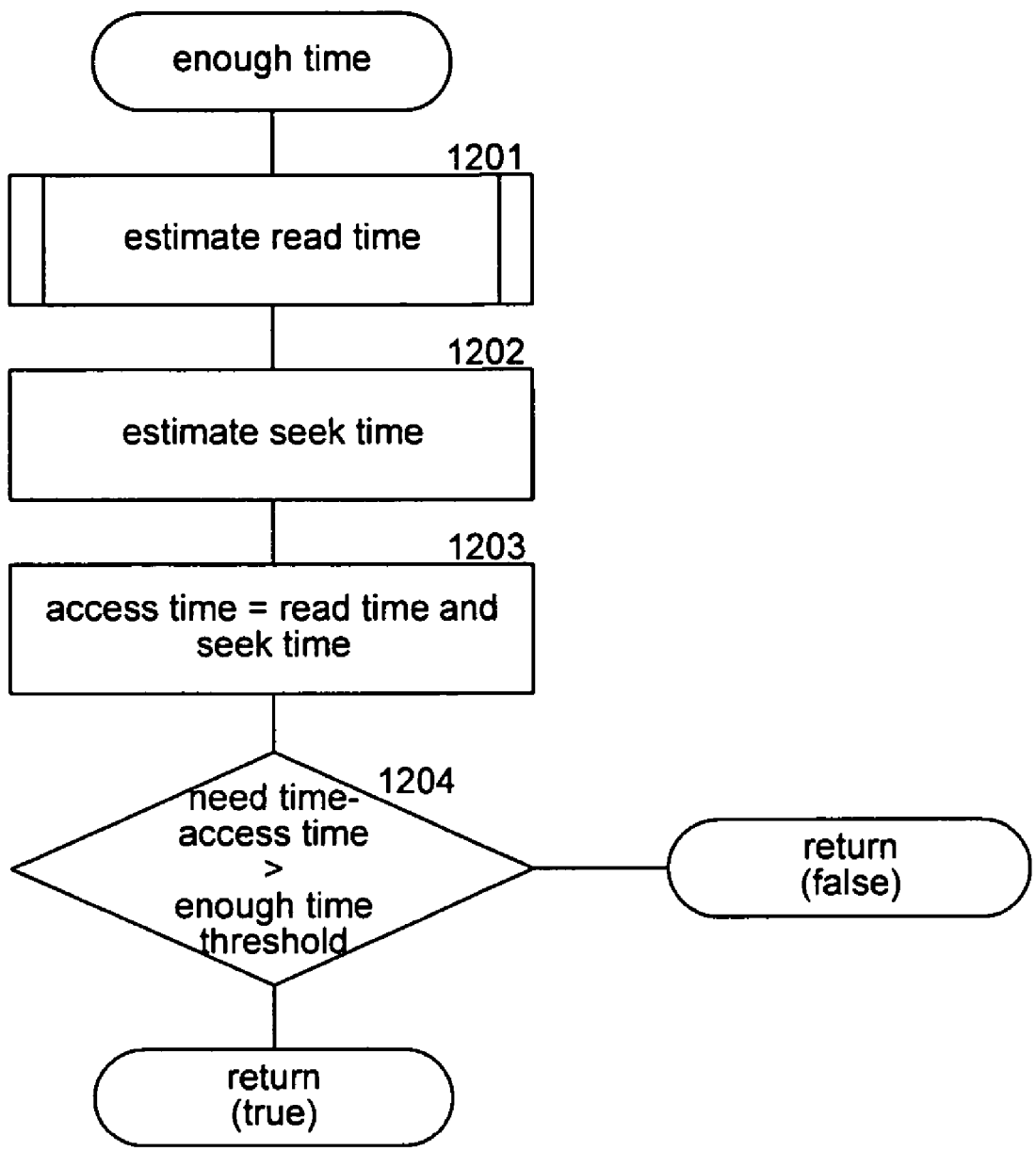
FIG. 12 is a flow diagram that illustrates the processing of a component that determines whether there is enough time to service another read request before servicing the read request at the top of the read queue in one embodiment.

FIG. 12 is a flow diagram that illustrates the processing of a component that determines whether there is enough time to service another read request before servicing the read request at the top of the read queue in one embodiment. The component is passed a read request and determines whether there is enough time to service the passed read request before servicing the read request at the top of the read queue. In block 1201, the component invokes the estimate read time component to estimate the time it will take to read the unit specified by the passed read request. In block 1202, the component estimates the seek time for the passed read request. The seek time depends on the current position of the read head along with the rotational position of the start of the unit relative to the read head. In block 1203, the component calculates the access time to service the passed read request as the sum of the estimated read time and the estimated seek time. In decision block 1204, if the needed time minus the access time is greater than an enough time threshold, then the component returns an indication of true, else the component returns an indication of false. The enough time threshold may be the minimum amount of time that should be available to make it worthwhile to determine whether another read request can be serviced first. For example, if there is not enough time to even read a single sector of data, then any determination would always indicate that there is not enough time to service another read request.

Figure 13:
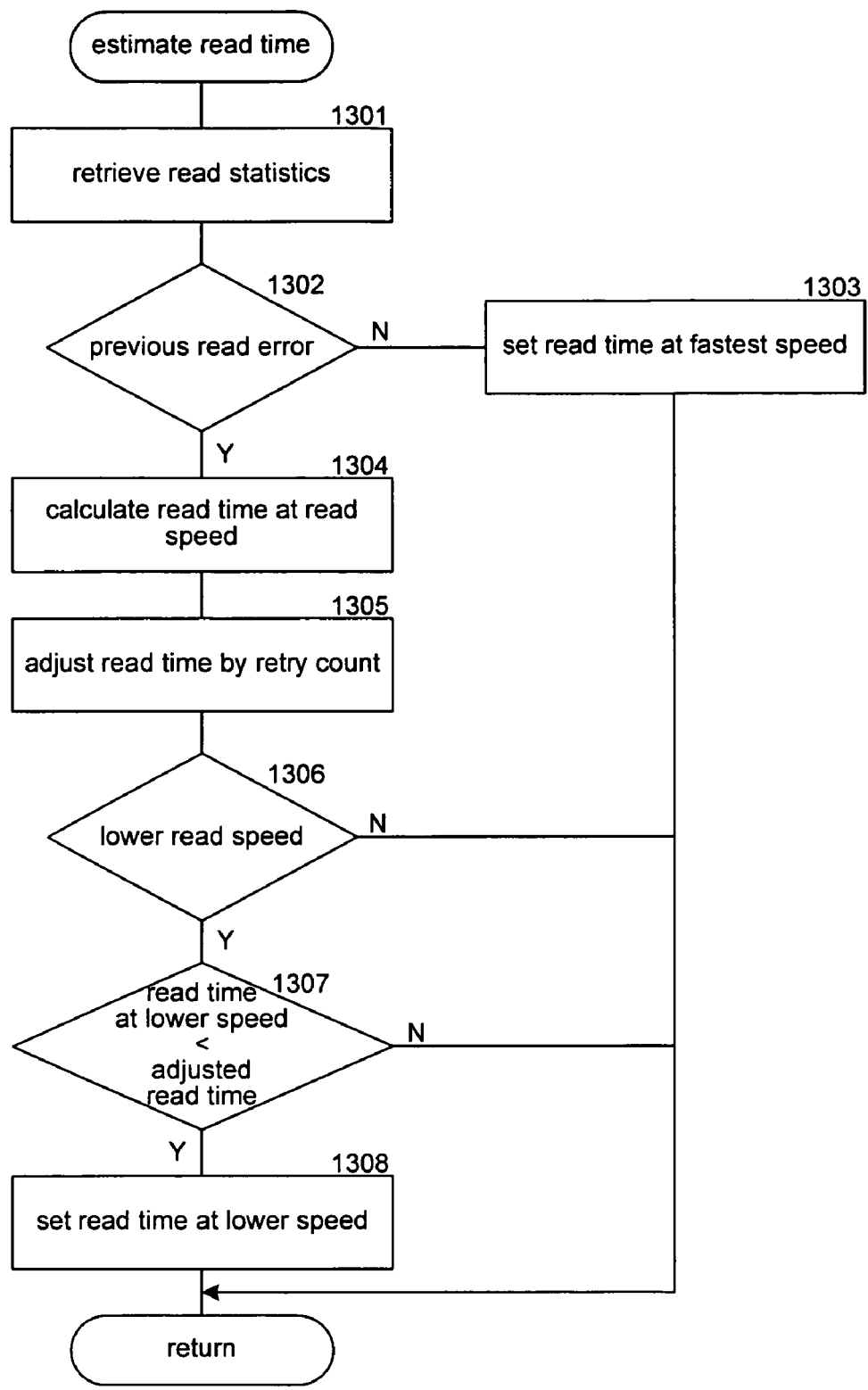
FIG. 13 is a flow diagram that illustrates the processing of the estimate read time component of the reorder system in one embodiment.

FIG. 13 is a flow diagram that illustrates the processing of the estimate read time component of the reorder system in one embodiment. The component is passed an indication of a read request and estimates a read time based on analysis of read statistics of the read statistics store. Alternatively, the component may estimate the read time based on the size of the unit to be read without regard to previous statistics. In block 1301, the component retrieves the statistics relating to the unit of the passed read request. In decision block 1302, if the read statistics indicate that an error occurred on the previous read, then the component continues at block 1304, else the component continues at block 1303. In block 1303, the component sets the read time to the read time associated with the fastest speed and then returns. In block 1304, the component sets the read time of the unit of the passed read request based on the speed of the last successful read. For example, if the read statistics indicates that the unit was last read at a medium speed, then the component calculates the read time based on that medium speed. In block 1305, the component adjusts the calculated read time based on the number of retries that were needed to read the unit at the speed of the last successful read. For example, if the number of retries is two, then the component may double the calculated read time in anticipation that two retries will be needed for the next successful read. In decision block 1306, if there is a speed lower than the speed of the last successful read, then the component continues at block 1307, else the component returns the adjusted read time. In decision block 1307, if the read time at the slower speed would be faster than the adjusted read time, then the component continues at block 1308, else the component returns an indication of the adjusted read time. For example, if the adjusted read speed is 50 milliseconds because it took five retries at 10 milliseconds each to last successfully read a unit and a single read of the unit at the lower speed will take 40 milliseconds, then the component may decide to read the unit at the slower speed. In block 1308, the component sets the read time associated with the lower speed and then returns that read time.

Figure 3:
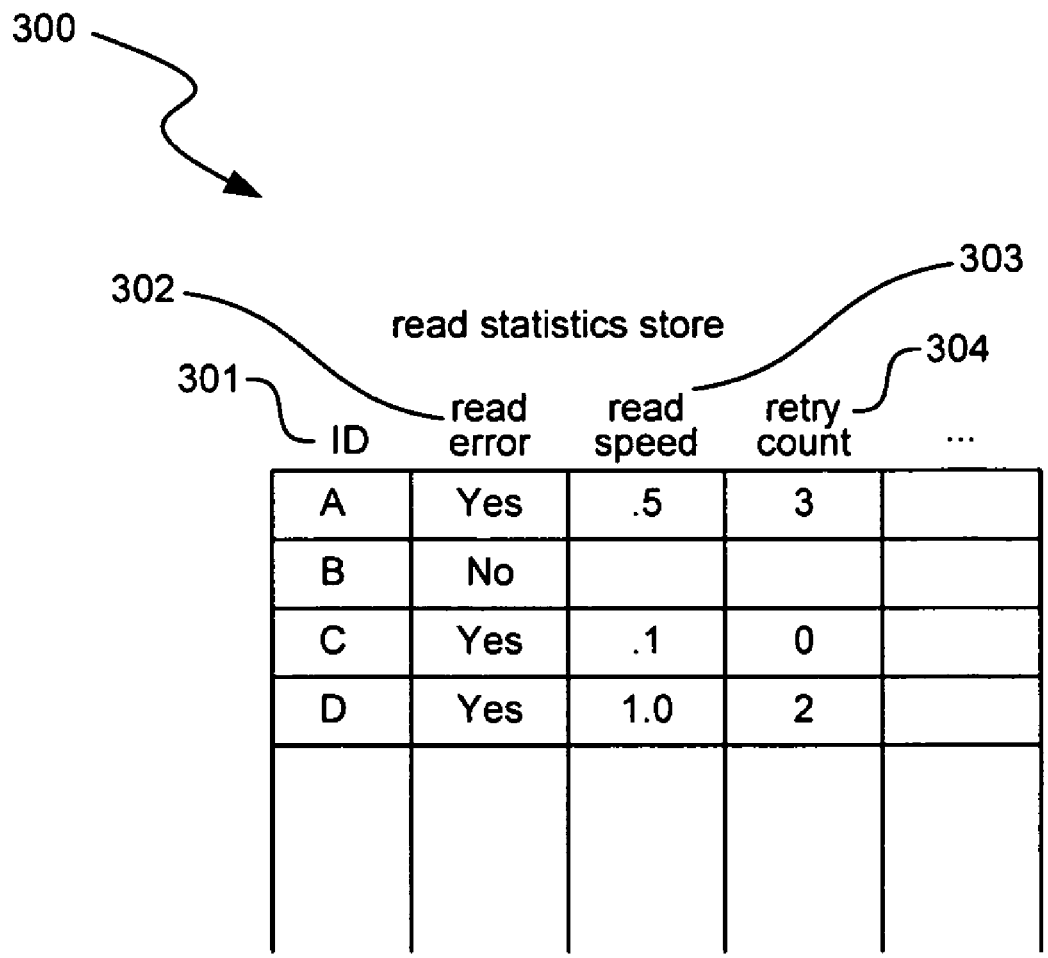
FIG. 3 is a diagram that illustrates sample data of the read statistics store in one embodiment.

FIGS. 3-9 are diagrams describing the access system in one embodiment. FIG. 3 is a diagram that illustrates sample data of the read statistics store in one embodiment. A read statistics store 300 includes an entry for each unit of the currently inserted storage medium that the accessing device has attempted to read. Each entry includes an identification column 301, a read error column 302, a read speed column 303, a retry count column 304, and so on. The identification column contains the identification of the unit. The read error column indicates whether the last read of that unit was in error. The read speed column indicates the read speed of the last successful read of that unit. The retry count column indicates the number of retries that were attempted at the read speed. For example, the entry for unit A indicates that the last read was in error, that the unit was successfully read at the read speed of 0.5, and that it took three attempts at the read speed of 0.5 to successfully read unit A. The access system may also maintain a history of read attempts for each unit and develop a read plan based on that history. The access system may also collect other statistics such as frequency of read requests, time of read requests, and so on. These additional statistics may be used by the cache replacement policy or to schedule speculative read requests. The access system may initialize the read statistics store each time a storage medium is inserted into the storage medium reading device.

Figure 4:
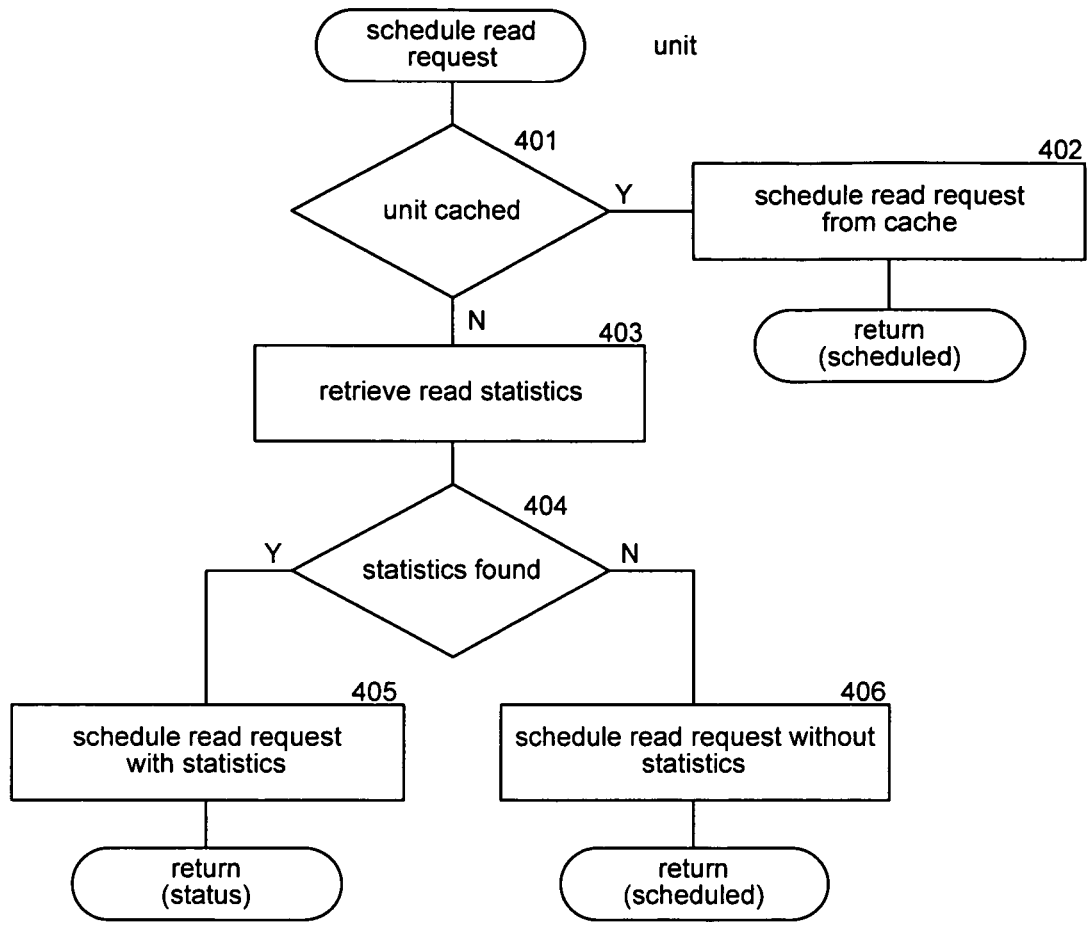
FIG. 4 is a flow diagram that illustrates the processing of the schedule read request component in one embodiment.

FIG. 4 is a flow diagram that illustrates the processing of the schedule read request component in one embodiment. The component is invoked to schedule a read request for a unit. The component first checks the cache to determine whether the read request can be satisfied from the cache. If not, the component retrieves the read statistics and schedules the read request factoring in the read statistics. In decision block 401, if the unit is cached, then the component continues at block 402, else the component continues at block 403. In block 402, the component schedules the read request to be from the cache and returns an indication that the read request has been scheduled. The component schedules a read request by adding it to the read queue. In block 403, the component retrieves the read statistics for the unit to be read. In decision block 404, if the read statistics for the unit are found, then the component continues at block 405, else the component continues at block 406. In block 405, the component invokes a schedule read request with statistics component to schedule the read request and then returns the status returned by the invoked component. In block 406, the component schedules the read request and returns an indication that it is scheduled.

Figure 5:
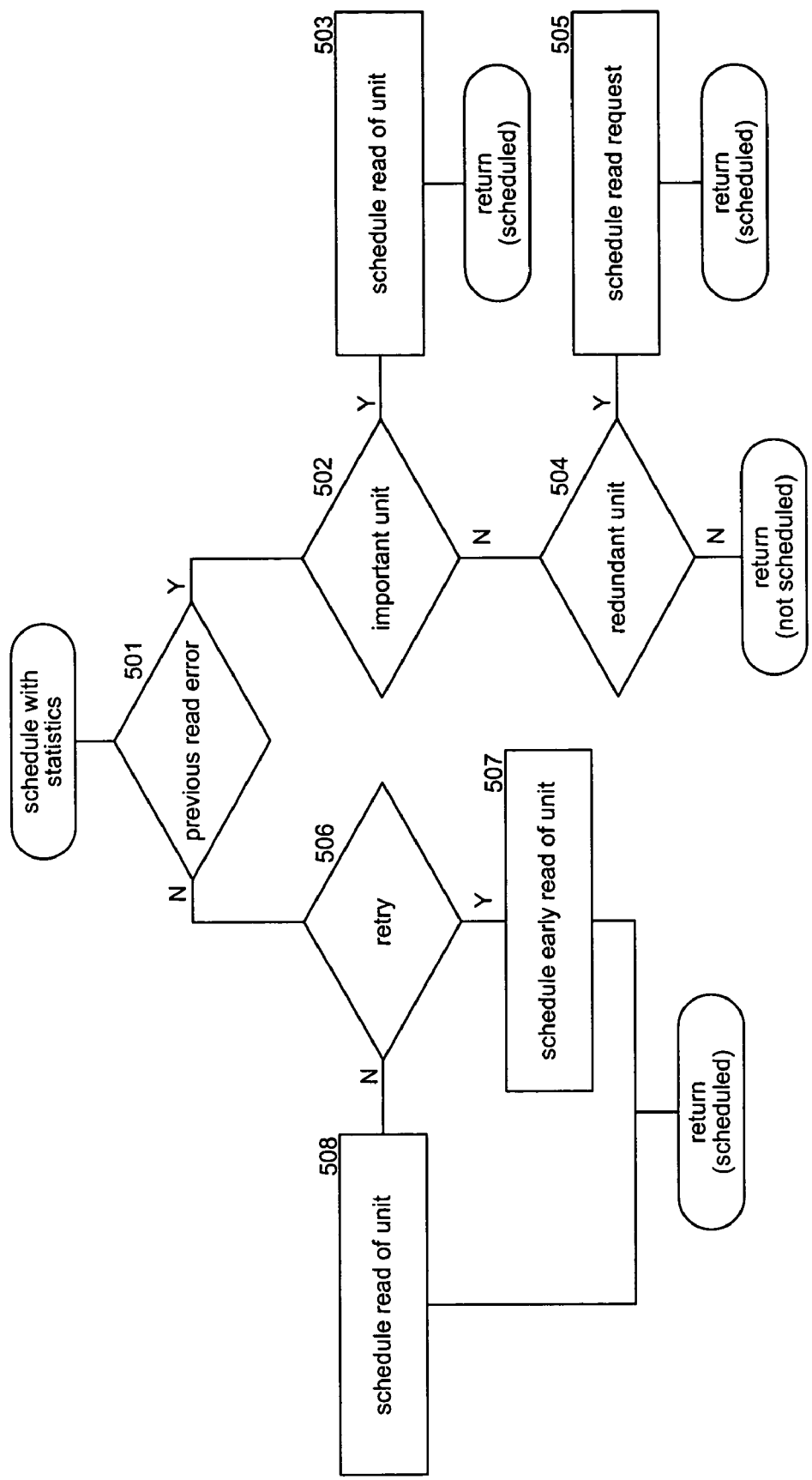
FIG. 5 is a flow diagram that illustrates the processing of the schedule read request with statistics component in one embodiment.

FIG. 5 is a flow diagram that illustrates the processing of the schedule read request with statistics component in one embodiment. The component bases the read plan on file importance, the availability of a redundant unit, and the number of previous retry attempts. The component may also invoke the reorder system to factor in a reordering of the read requests. In decision block 501, if the unit was not previously read because of an error, then the component continues at block 502, else the component continues at block 506. In decision block 502, if the unit contains important information, then the component continues at block 503, else the component continues at block 504. In block 503, the component schedules the read request of the important unit and returns an indication that the read request has been scheduled. In decision block 504, if the unit has a redundant copy, then the component continues at block 505, else the component returns an indication that the read request was not scheduled. In block 505, the component schedules the read request and then returns an indication that the read request has been scheduled. In decision block 506, if the previous read was not successful on the first attempt, then the component continues at block 507, else the component continues at block 508. In block 507, the component schedules the read request with an early start time and then returns an indication that the request has been scheduled. In block 508, the component schedules the read of the unit at a normal start time and then returns an indication that the read request has been scheduled. Although not shown in FIG. 5, the component may also determine an initial read speed as part of the read plan.

Figure 6:
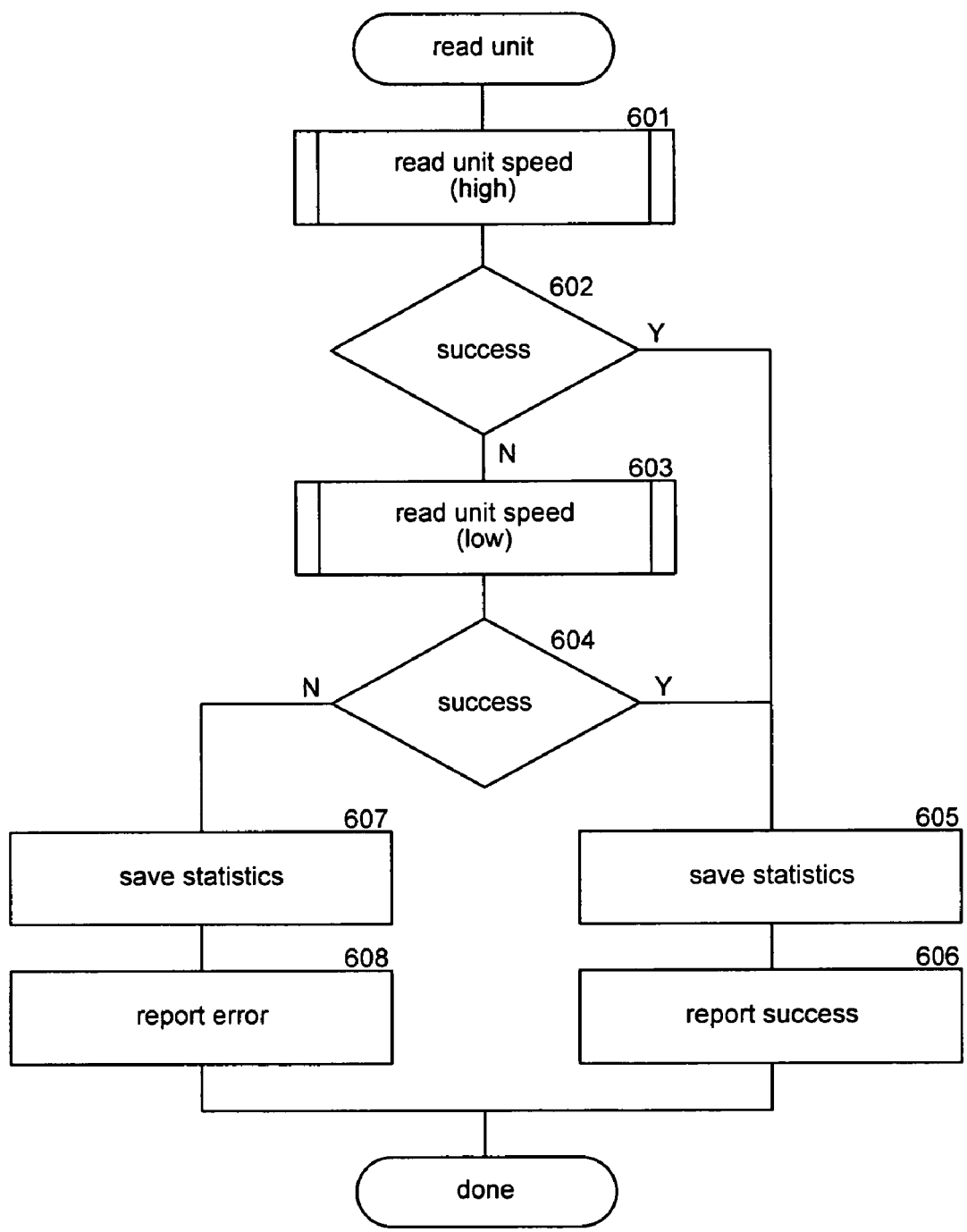
FIG. 6 is a flow diagram that illustrates the processing of the read unit component in one embodiment.

FIG. 6 is a flow diagram that illustrates the processing of the read unit component in one embodiment. The component attempts to read the unit at a high speed and, if unsuccessful, attempts to read the unit at a low speed. In block 601, the component invokes a read unit at speed component passing an indication of a high speed. In decision block 602, if the read at the high speed was successful, then the component continues at block 605, else the component continues at block 603. In block 603, the component invokes the read unit at speed component passing an indication of a low speed. In decision block 604, if the read was successful at the low speed, then the component continues at block 605, else the component continues at block 607. In block 605, the component stores the read statistics of the successful read in the read statistics store. In block 606, the component reports the success of the read and then completes. In block 607, the component stores the read statistics of the unsuccessful read in the read statistics store. In block 608, the component reports the unsuccessful read and then completes.

Figure 7:
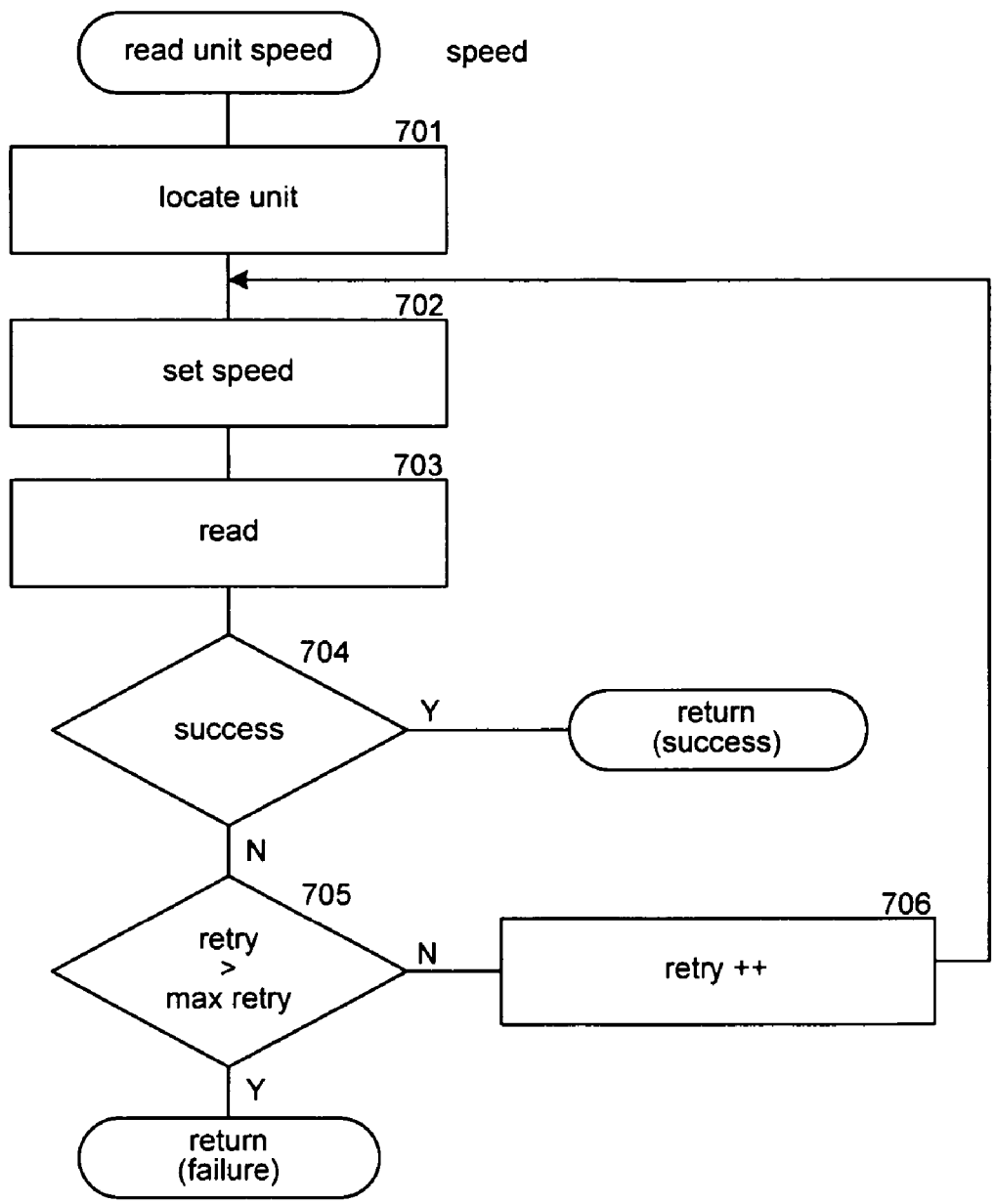
FIG. 7 is a flow diagram that illustrates the processing of the read unit at speed component in one embodiment.

FIG. 7 is a flow diagram that illustrates the processing of the read unit at speed component in one embodiment. The component is passed an indication of the speed at which the unit is to be read. The component may make several attempts at reading the unit at the speed. In block 701, the component locates the unit. For example, if the unit is a file, then the component may access the index to identify the start sector of the file. In blocks 702-706, the component loops attempting to read the unit. In block 702, the component sets the speed to the passed speed. In block 703, the component attempts to read the unit at the set speed. In decision block 704, if the read was successful, then the component returns an indication of success, else the component continues at block 705. In decision block 705, if the current count of the retries is greater than the maximum number of retries allowed, then the component returns an indication of failure, else the component increments the retry count in block 706 and loops to block 702 to retry reading the unit.

Figure 8:
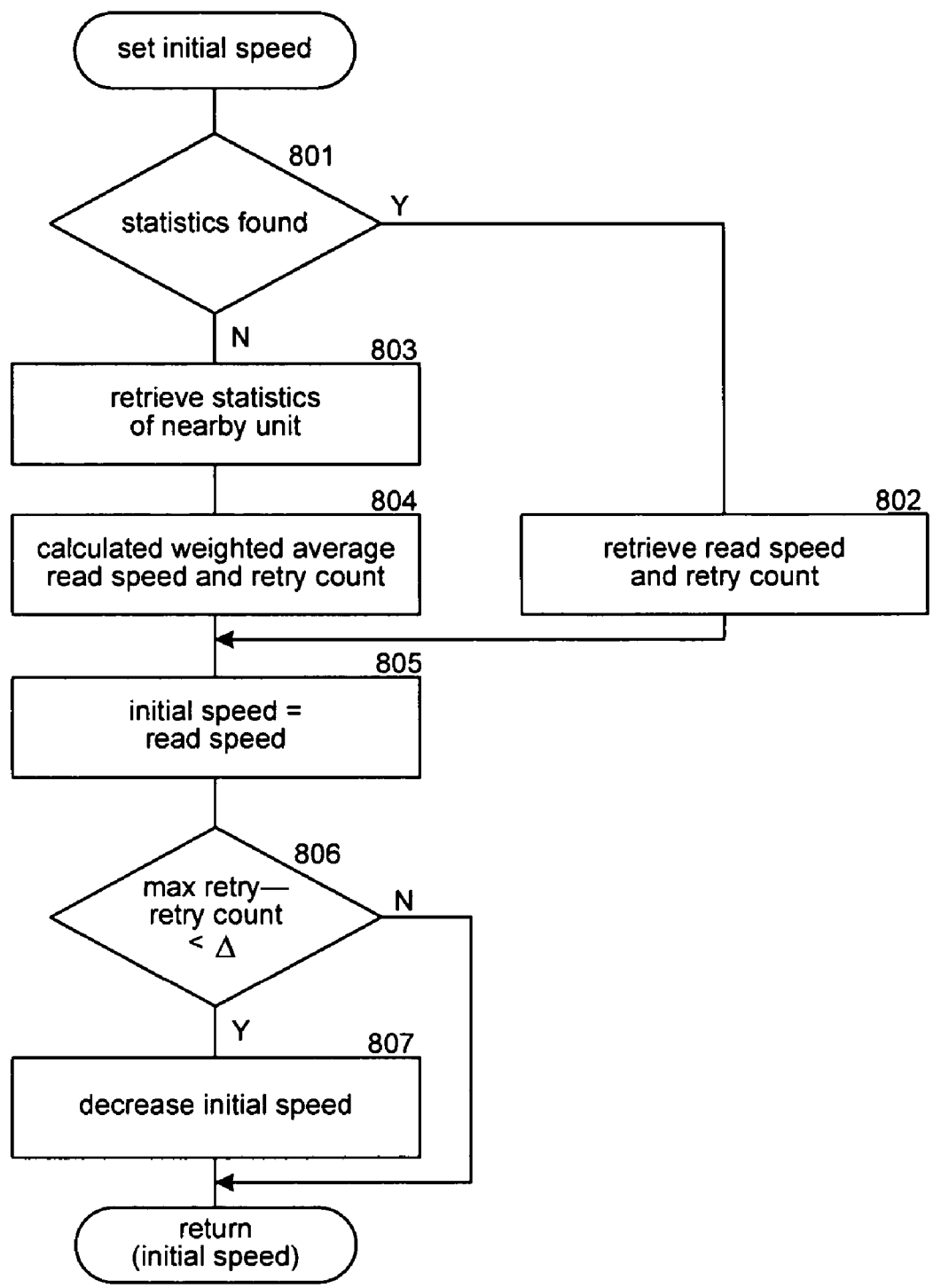
FIG. 8 is a flow diagram that illustrates the processing of a component to set the initial read speed.

FIG. 8 is a flow diagram that illustrates the processing of a component to set the initial read speed. If the read statistics indicate that the unit is likely not readable at a high speed, then the component will set the initial speed to a low speed. In decision block 801, if read statistics are found for the unit to be read, then the component continues at block 802, else the component continues at block 803. In block 802, the component retrieves the read speed and retry count for the unit and continues at block 805. In block 803, the component retrieves the read statistics for units near the unit to be read. In block 804, the component calculates weighted averages of the read speed and retry count for the nearby units. The weighted averages may factor in the distance between the unit to be read and the nearby units. In block 805, the component sets the initial speed to the read speed of the read statistics of the unit or to the average read speed of nearby units. In decision block 806, if the retry count is close to the maximum retry count, then the component continues at block 807, else the component returns an indication of the initial speed. If the retry count is close to the maximum retry count, then the component may decide to decrease the initial speed to increase the chances that the first attempt to read the unit may be successful. In block 807, the component decreases the initial speed and returns an indication of the initial speed.

Figure 9:
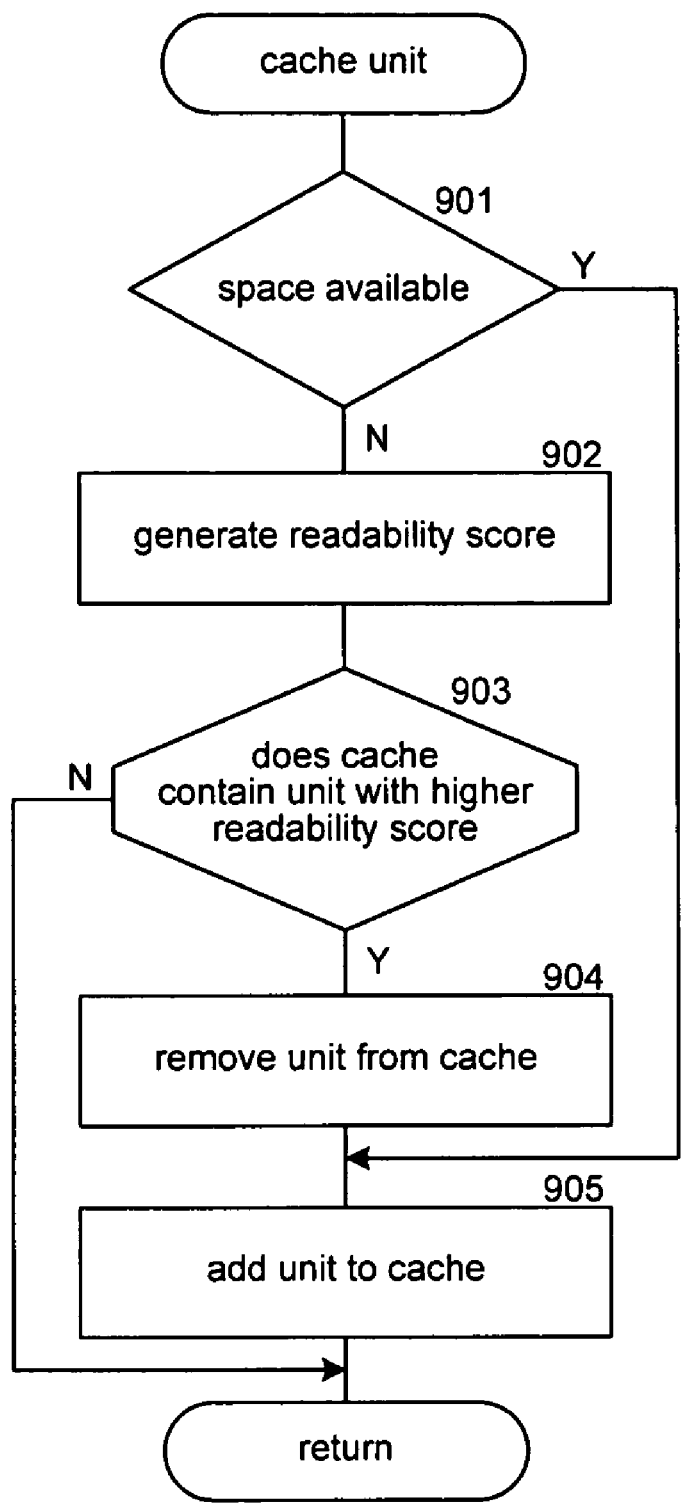
FIG. 9 is a flow diagram that illustrates the processing of a component that implements a cache replacement policy in one embodiment.

FIG. 9 is a flow diagram that illustrates the processing of a component that implements a cache replacement policy in one embodiment. This component implements a cache replacement policy in which the unit with the highest readability score is removed from the cache. In decision block 901, if there is space available in the cache, then the component continues at block 905, else the component continues at block 902. In block 902, the component generates a readability score for the unit that was just successfully read. In decision block 903, if the cache contains a unit with a higher readability score, then the component continues at block 904, else the component returns without caching the unit. In block 904, the component removes the unit with the highest readability score from the cache. In block 905, the component adds the newly read unit to the cache and then returns.

From the foregoing, it will be appreciated that specific embodiments of the reorder system have been described herein for purposes of illustration, but that various modifications may be made without deviating from the spirit and scope of the invention. One skilled in the art will appreciate that various components of the reorder system can be used independently of or in combination with other components. For example, the cache replacement algorithm may be used in an environment where no read plan is developed. Also, the reorder system can reorder read requests as they are added to the read queue, as they are removed from the read queue, and so on. The reorder system may be integrated with an access system or may be invoked by an access system. The reorder system may be used with various types of removable and non-removable storage disc-based storage media. In addition, the reorder system may be used with any storage medium that has a variable time to seek a location to be read. Accordingly, the invention is not limited except as by the appended claims.

We claim:

1. A method in a computer system for servicing read requests for a storage medium, the storage medium having units of data, each unit of data identified by an identifier, the storage medium capable of being accessed at different read speeds, the method comprising:
    tracking read statistics generated from attempts to read units of data of the storage medium when servicing read requests, the read statistics being tracked on a per-unit of data basis, the read statistics for one unit of data indicating, for each of a plurality of attempted reads to service one read request for the unit of data, a read speed of the attempted read and whether the attempted read was successful;
    estimating read times for read requests, each read request including the identifier of a unit of data to be read, the estimated read time for a read request being based on the read statistics for the unit of data identified by the identifier of the read request;
    identifying a read request for the storage medium, the read request including an identifier of a unit of data, the unit have data having tracked read statistics that include, for a read request specifying the identifier of that unit of data, for each of a plurality of attempted reads to that unit of data, a speed of the attempted read and whether the attempted read was successful;
    determining whether there is enough time to service another read request before servicing the identified read request based on comparison of the estimated read times;
    when it is determined that there is enough time to service another read request, indicating an order in which the other read request is to be serviced before the identified read request; and
    servicing the identified read request and the other read request in the indicated order.

2. The method of claim 1 wherein the unit of data is a file.

3. The method of claim 1 wherein the storage medium is removable from a storage medium read device and the read statistics are separately tracked for each removable storage medium.

4. The method of claim 1 wherein the storage medium is removable from a storage medium read device and the read statistics are reset when a storage medium is removed.

5. The method of claim 1 wherein the unit of data is a sector.

6. The method of claim 1 wherein the read requests are to read from a storage medium having locations and having a seek time associated with seeking a location from a current location.

7. The method of claim 6 wherein the identified read request has a location and the other read request has a location, wherein the storage medium has a current location, and wherein the location of the other read request is between the current location and the location of the identified read request.

8. The method of claim 7 wherein the storage medium is disc-based and a storage medium read device includes a moveable read head.

9. A computer-readable medium containing instructions for controlling a read device to service read requests to a disc-based storage medium with locations of units of data that are accessible through the read device, the read device having a current position corresponding to a current location of a unit of data of the storage medium, by a method comprising:
    tracking read statistics generated from attempts to read data of the storage medium, the read statistics being tracked on a per-unit of data basis and being derived from a number of attempts to read a unit of data, each attempt to read a unit of data having a read speed and an indication of whether the unit of data was successfully read during that attempt;
    generating read plans for read requests, each read request specifying a location of a unit of data to be read, the read plan for a read request being based on the read statistics for the unit of data for the specified location, the read plans indicating a number of attempts at each of a plurality of read speeds, one read plan specifying at least one attempt at each of two or more read speeds;
    estimating read times for read requests based on the read plans;
    identifying a read request that specifies an identified location;
    selecting another read request that specifies another location that is between the current location and the identified location;
    determining whether there is enough time to service the other read request before servicing the identified read request by comparing the estimated read times generated based on the read statistics; and
    when there is enough time to service the other read request before servicing the identified read request, servicing the other read request before servicing the identified read request.

10. The computer-readable medium of claim 9 wherein a unit of data is a sector.

11. The computer-readable medium of claim 10 wherein the unit of data is a file.

12. The computer-readable medium of claim 9 including after servicing the other read request,
- selecting a second other read request that specifies a second other location that is between the other location and the identified location; and
- when there is enough time to service the second other read request before servicing the identified read request, servicing the second other read request before servicing the identified read request.

13. The computer-readable medium of claim 9 wherein the read requests are to read from a storage medium having locations and having a seek time associated with seeking a location from a current location.

14. The computer-readable medium of claim 9 wherein a read request includes a needed time by which the read request needs to be serviced, including determining whether there is enough time to service another read request based on statistics associated with servicing previous read requests, and including after servicing the other read request,
- selecting a second other read request that specifies a second other location that is between the other location and the identified location; and
- when there is enough time to service the second other read request before servicing the identified read request, servicing the second other read request before servicing the identified read request.

15. A computer system for servicing read requests to a disc-based storage medium that is removable from a storage medium read device, comprising:
- means for tracking read statistics on a per unit of data basis, the read statistics being generated from unsuccessful and successful attempts to read the storage medium, the read statistics for a unit of data indicating for each servicing of a read request for the unit of data, for each of a plurality of attempted reads of the unit of data, an indication of a read speed of the attempted read and whether the attempted read was successful, wherein at least two attempted reads of the unit of data were at different read speeds;
- means for estimating read times of read requests for units of data based on the read statistics, the estimated read time of a read request being based on the read statistics tracked for the unit of data of the read request;
- means for identifying a read request for the storage medium;
- means for servicing another read request before servicing the identified read request when there is enough time to service the other read request as indicated by the estimated read times; and
- means for servicing the identified read request after servicing the other read request.

16. The computer system of claim 15 including means for determining whether there is enough time based on a needed time specified by a program that submits a read request.

17. The computer system of claim 16 wherein the means for servicing services multiple other read requests before the identified read request is serviced.

18. The computer system of claim 16 wherein the means for determining whether there is enough time uses read statistics associated with servicing previous read requests to the disc-based storage medium.

19. A computer system for caching data of a storage device, comprising:
- a component that tracks read statistics generated on a per-unit of data basis from successful attempts and unsuccessful attempts to read units of data of the storage device, the read statistics for each attempt to read a unit of data indicating one of multiple read speeds at which the storage device was accessed during the attempt and whether the attempt was successful;
- a component that generates a readability score for a unit of data that estimates ease at which the unit data can be read given the read statistics;
- a cache having units of data with readability scores;
- a component that reads a unit of data from the storage device;
- a component that identifies a unit of data of the cache whose readability score indicates that it is easier to read than the read unit of data; and
- a component that replaces the identified unit of data in the cache with the read unit of data.

20. The computer system of claim 19 wherein when generated statistics are not available for a unit of data to be read, the component that generates the readability score generates a readability score based on generated statistics for units of data in proximity of the unit of data to be read.

* * * * *